United States Patent
Scriber

(10) Patent No.: US 12,470,573 B1
(45) Date of Patent: Nov. 11, 2025

(54) SYSTEMS AND METHODS FOR MANAGING NETWORKS FOR IMPROVED DEVICE CONNECTIVITY

(71) Applicant: CABLE TELEVISION LABORATORIES, INC., Louisville, CO (US)

(72) Inventor: Brian A. Scriber, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 381 days.

(21) Appl. No.: 17/686,678

(22) Filed: Mar. 4, 2022

Related U.S. Application Data

(60) Provisional application No. 63/157,003, filed on Mar. 5, 2021.

(51) Int. Cl.
  G06F 21/00 (2013.01)
  H04L 9/40 (2022.01)
  G16Y 30/10 (2020.01)

(52) U.S. Cl.
  CPC ...... H04L 63/1425 (2013.01); H04L 63/0227 (2013.01); H04L 63/10 (2013.01); G16Y 30/10 (2020.01)

(58) Field of Classification Search
  CPC . H04L 63/1425; H04L 63/0227; H04L 63/10; G16Y 30/10
  See application file for complete search history.

(56) References Cited

U.S. PATENT DOCUMENTS

| | | | | |
|---|---|---|---|---|
| 9,654,485 | B1* | 5/2017 | Neumann | H04L 63/1416 |
| 11,025,663 | B1* | 6/2021 | Russell | G06N 20/00 |
| 2004/0015719 | A1* | 1/2004 | Lee | H04L 63/0227 709/224 |
| 2004/0120262 | A1* | 6/2004 | Hirose | H04L 43/0811 370/252 |
| 2006/0253900 | A1* | 11/2006 | Paddon | H04L 63/0227 726/11 |
| 2011/0225640 | A1* | 9/2011 | Ganapathy | H04W 12/06 726/8 |
| 2012/0036234 | A1* | 2/2012 | Staats | H04L 63/20 709/220 |
| 2012/0215862 | A1* | 8/2012 | Cai | H04L 47/824 709/206 |

(Continued)

Primary Examiner — Michael M Lee
(74) Attorney, Agent, or Firm — Armstrong Teasdale LLP

(57) ABSTRACT

A network device for maintaining a communication network is provided. The network device includes a transceiver configured for operable communication with at least one device. The network device also includes a processor including a memory configured to store computer-executable instructions. When executed by the processor the instructions cause the network device to store a plurality of settings for operation of the communication network, monitor message traffic to and from one or more devices on the communication network, generate a report based on the monitored message traffic, transmit, to a user via a user device, the report, receive, from the user via the user device, an update to one or more settings of the plurality of settings for operation of the communication network, monitor additional message traffic, and filter one or more messages of the additional message traffic based on the updated plurality of settings.

20 Claims, 6 Drawing Sheets

(56) References Cited

U.S. PATENT DOCUMENTS

| | | | | |
|---|---|---|---|---|
| 2013/0305362 | A1* | 11/2013 | Hermanns | H04L 63/08 |
| | | | | 726/22 |
| 2015/0026794 | A1* | 1/2015 | Zuk | H04L 47/2441 |
| | | | | 726/13 |
| 2015/0156183 | A1* | 6/2015 | Beyer | H04L 63/145 |
| | | | | 726/4 |
| 2015/0372977 | A1* | 12/2015 | Yin | H04L 63/0263 |
| | | | | 726/1 |
| 2019/0268305 | A1* | 8/2019 | Xu | H04L 61/5007 |
| 2020/0067801 | A1* | 2/2020 | McCormick | H04L 43/062 |
| 2020/0287929 | A1* | 9/2020 | Biever, Jr. | G06F 21/577 |
| 2020/0396211 | A1* | 12/2020 | Dobbins | G06F 21/52 |

* cited by examiner

SYSTEMS AND METHODS FOR MANAGING NETWORKS FOR IMPROVED DEVICE CONNECTIVITY

CROSS REFERENCE TO RELATED APPLICATIONS

This application claims the benefit of and priority to U.S. Provisional Application No. 63/157,003, filed Mar. 5, 2021, entitled "PRIVACY ARMOR" which is hereby incorporated by reference in its entirety.

BACKGROUND

The field of the invention relates generally to managing computer networks, and more specifically, to systems and methods for monitoring devices on a network to detect and report potential cybersecurity threats.

Many access networks are forming anti-abuse teams to protect their users from malware and to prevent malware from affecting their networks. In addition, some jurisdictions have started to pass legislation to notify users of potential botnet participation by their devices. While the access networks may be able to detect potentially infected activity, the access networks may only be able to identify potentially infected devices by MAC (media access control) address. Additionally, access networks may temporarily or permanently disconnect users while the users have infected devices.

While many users have malware scanners for their personal computers, most users do not have scanners capable of scanning their connected IoT (Internet of Things) devices. Furthermore, most users do not have an easy way to identify which device might be infected. In addition, users generally are not able to easily identify their devices just from the devices' MAC addresses. Moreover, users may not be able to easily cleanse or update their infected devices. Accordingly, it would be useful to have a system for monitoring and managing the devices on a user's network.

BRIEF DESCRIPTION

In an embodiment, a network device for maintaining a communication network is provided. The network device including one device over a communication medium of the communication network and a processor including a memory configured to store computer-executable instructions. When executed by the processor computer-executable instructions cause the network device to store a plurality of settings for operation of the communication network, monitor message traffic to and from one or more devices on the communication network, generate a report based on the monitored message traffic, transmit, to a user via a user device, the report, receive, from the user via the user device, an update to one or more settings of the plurality of settings for operation of the communication network, monitor additional message traffic to and from one or more devices on the communication network, and filter one or more messages of the additional message traffic based on the updated plurality of settings.

In another embodiment, a method for maintaining a communication network is provided. The method is implemented by a computer device including a transceiver configured for operable communication with at least one device over a communication medium of the communication network and a processor including a memory configured to store computer-executable instructions. The method includes storing a plurality of settings for operation of the communication network, monitoring message traffic to and from one or more devices on the communication network, generating a report based on the monitored message traffic, transmitting, to a user via a user device, the report, receiving, from the user via the user device, an update to one or more settings of the plurality of settings for operation of the communication network, monitoring additional message traffic to and from one or more devices on the communication network, and filtering one or more messages of the additional message traffic based on the updated plurality of settings.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
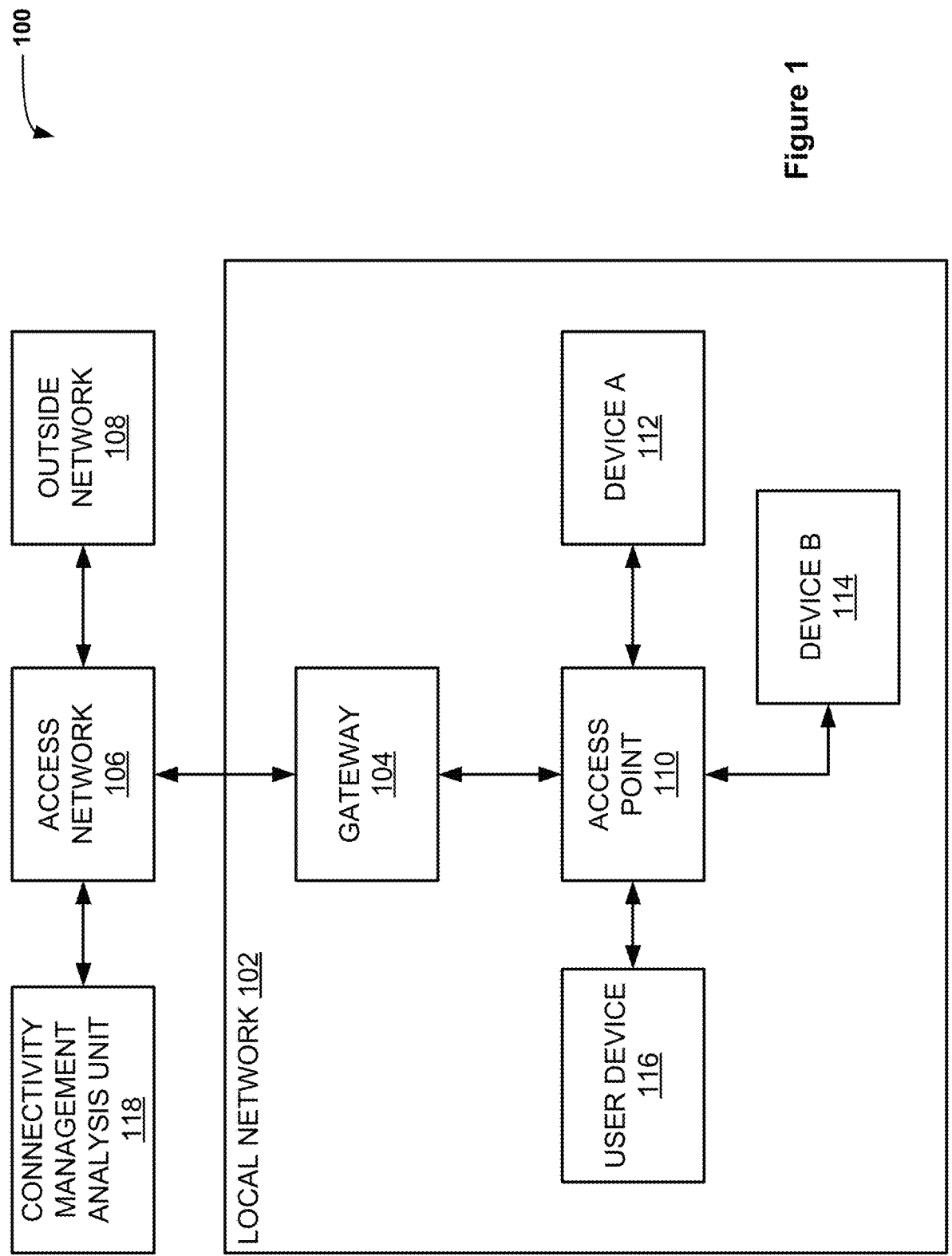
FIG. 1 illustrates a first computer network configured for monitoring and managing devices on the network in accordance with at least one embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged;

such ranges are identified and include all the sub-ranges contained therein unless context or language indicates otherwise.

As used herein, the term "cybersecurity threat" includes an unauthorized attempt to gain access to a computer network or system. Cybersecurity threats, also known as cyber-attacks or cyber-threats, attempt to breach computer systems by taking advantage of vulnerabilities in the computer systems. Some cybersecurity threats include attempts to damage or disrupt a computer network or system. These cybersecurity threats may include, but are not limited to, active intrusions, spy-ware, mal-ware, viruses, and worms. Cybersecurity threats may take many paths (also known as attack paths) to breach a system. These paths may include operating system attacks, misconfiguration attacks, application level attacks, and shrink wrap code attacks. Cybersecurity threats may be introduced by individuals or systems directly accessing the computer system or remotely via a communications network.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

A computer program of one embodiment is embodied on a computer-readable medium. In an example, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments are described below with respect to several components of a conventional cable and/or wireless/Wi-Fi networks. Optical networks though, are also contemplated within the scope of the present embodiments. Such optical networks may include, without limitation, an Optical Network Terminal (ONT) or Optical Line Termination (OLT), and an Optical Network Unit (ONU), and may utilize optical protocols such as EPON, RFOG, or GPON. Other types of communication systems our further contemplated, including communication systems capable of x-hauling traffic, satellite operator communication systems, MIMO communication systems, microwave communication systems, short and long haul coherent optic systems, etc. X-hauling is defined herein as any one of or a combination of front-hauling, backhauling, and mid-hauling.

In these additional embodiments, the MTS may include, without limitation, a termination unit such as an ONT, an OLT, a Network Termination Unit, a Satellite Termination Unit, a Cable MTS (CMTS), or other termination systems collectively referred to herein as "Modem Termination Systems (MTS)". Similarly, the modem described above may include, without limitation, a cable modem (CM), a satellite modem, an Optical Network Unit (ONU), a DSL unit, etc., which are collectively referred to herein as "modems." Furthermore, the DOCSIS protocol may be substituted with, or further include protocols such as EPON, RFoG, GPON, Satellite Internet Protocol, without departing from the scope of the embodiments herein.

The field of the invention relates generally to generally to managing computer networks, and more specifically, to systems and methods for monitoring devices on a network to detect and report potential cybersecurity threats.

For ease of explanation, the following description may generically refer to these several innovative embodiments as "the connectivity management system." The connectivity management system herein enables the user, consumer, and/or customer to easily monitor and update devices on a computer network and to prevent those devices from communicating with outside networks in an infected manner. In particular, the present embodiments may include one or more of a device to be connected to the network, a device already connected to the network, a gateway and/or controller, and a set of network messages.

In the present connectivity management system, communication entities, such as access points, gateways, and/or access networks, monitor communications between devices on networks and with outside networks, such as the Internet. The connectivity management system analyzes the monitored communications to detect potential cybersecurity threats, such as, but not limited to, botnet participation, communicating with IP addresses in unusual or unexpected locations, excessive or unusual patterns of bandwidth use, spam participation, unusual communication methods, and/or any other potential infected behavior. The connectivity management system then summarized and reports the communication patterns to the user.

The connectivity management system also allows the user to prevent devices from performing undesired activities. For example, if a smart refrigerator has been participating in botnet activities on one or more specific ports, the connectivity management system can instruct the smart refrigerator to stop communicating on those ports. The connectivity management system can also instruct one or more of the access point, gateway, and/or access network to prevent communications to and from the smart refrigerator on those ports. This can be done while still allowing the smart refrigerator to communicate on its traditional ports, such as to remotely provide images of the inside of the refrigerator to the user device, when the user is in the grocery store.

In an exemplary embodiment, the connectivity management device is the gateway of the network. In other embodiments, the connectivity management device is an access point or a part of the access network, such as a modem termination system (MTS). In these configurations, the connectivity management device may monitor and manage all messages to and from the outside networks. In some embodiments, the connectivity management device copies and transmits device messages to a connectivity management analysis unit outside of the network. This connectivity management analysis unit may then analyze the messages to determine what each device is transmitting outside of the network, what is being received from outside of the network, and how each affects the performance of the network. The connectivity management analysis unit can also provide summaries of the devices on the network and/or subnet.

The systems and methods described herein are not limited by the networking protocol used and can be applied to a plurality of network systems and types. These systems and types can include, but are not limited to, cable, 3GPPS 5G technology, optical networks, Low Earth Orbit (LEO) networks, ethernet based networks, IEEE systems (e.g., 802.11 and 16), 5G/MIMO (multiple input multiple output) (OFDM (orthogonal frequency-division multiplexing), BDMA), 4G LTE, 4G (CDMA) WiMAX, 3G HSPA+/UMTS (WCDMA/CDMA), 2G/GSM (TDMA/CDMA), Wi-Fi (all), Optical (PON/CPON/etc.), Ethernet (all: 10Base2, 10Base5, 10BaseT, 100BaseTX, 100Base FX, 1000Base SX, 1000Base LX, etc.), DSL, and RAN, for non-limiting examples.

FIG. 1 illustrates a first computer network 100 configured for monitoring and managing devices on the network 100 in accordance with at least one embodiment.

In an exemplary embodiment, first computer network 100 is a local network 102. In this example, local network 102 is depicted, by way of example and not in a limiting sense, a local area network (LAN) and includes a gateway 104 with access to one or more outside networks 108 via an access network 106. Access networks 106 interface between the local network 102 and one or more outside networks 106 (shown in FIG. 1). In some embodiments, access networks 106 are associated with an access provider, such as an Internet service provider (ISP). For example, the local network 102 could be a home network of a subscriber whose Internet access is provided through the access network 106. Outside networks 108 may include, but are not limited to, the Internet, another LAN, an access network, and a wide area network (WAN).

Local network 102 includes at least one access point 110. Access point 110 connects device A 112, device B 114, and user device 116 to local network 102. Access point 110 allows device A 112, device B 114, and/or user device to connect using wired and/or wireless connections. In some embodiments, access point 110 is a part of gateway 104. In other embodiments, access point 1100 is separate from gateway 104. The local network 102 can include multiple access points 110. Access points 110 can include, but is not limited to, a Wi-Fi router, a Wi-Fi extender, a hub, a router, a switch, and/or any other network device that allows devices to connect to the local network 102.

Devices A 112 and B 114 may include, but are not limited to, IoT devices, such as IP cameras, smart home devices, smart televisions, smart speakers, and/or other devices capable of recording and/or communicating one or more of audio, video, and/or data. Local network 102 also includes one or more user devices 116. User devices 116 may include smart phones, tablets, laptop computers, and/or any other computer devices capable of interacting with local network 102 as described herein. User devices 116 may connect to access point 110 by wired and/or wireless connections, based on the user device 116 itself. Some user devices 116 may be associated with local network 102 and are connected to local network 102 on a regular basis. Other user devices 116 may connect to local network 102 occasionally, such as a user device 116 belonging to a guest on local network 102.

In an exemplary embodiment, the gateway 104 of the local network 102 acts as a connectivity management analysis unit 118. In other embodiments, the connectivity management analysis unit 118 is the access point 110 or a part of the access network 106, such as a part of the modem termination system (MTS) 220 (shown in FIG. 2). In these configurations, the gateway 104, the access point 110, and/or MTS 220 act as the connectivity management analysis unit 118 may monitor and manage all messages to and from the outside networks 106. In some embodiments, the device messages are transmitted to a connectivity management analysis unit 118 outside of the network 102. The connectivity management analysis unit 118 analyzes the messages to determine what each device 112, 114, and 116 is transmitting outside of the local network 102, what is being received from outside of the local network 102, and how each affects the performance of the local network 102. The connectivity management analysis unit 118 can also provide summaries of the communications of the devices 112, 114, and 116 on the local network 102 and/or subnets.

In the exemplary embodiment, the connectivity management analysis unit 118 generates a report of the message traffic to and from the devices 112, 114, and 116 on the local network 102. The connectivity management analysis unit 118 can then present the report to the user, such as via the user device 116. In some further embodiments, the connectivity management analysis unit 118 allows the user to limit how different devices 112, 114, and 116 access the outside networks 108. In some embodiments, the connectivity management analysis unit 118 can prevent devices 112, 114, and 116 on the local network 102 from performing specific activity, communicating over specific ports, and/or communicating with particular IP addresses. In these embodiments, the gateway 104, the access point, and/or the access network 106 may block messages to and from the blocked ports and/or IP address.

In still further embodiments, the connectivity management analysis unit 118 may be able to determine what each device 112, 114, and 116 on the network is. This may be determined when the device 112, 114, and 116 is onboarded onto the local network 102. This may also be determined based on the message traffic to and from the device 112, 114, and 116. In these embodiments, the connectivity management analysis unit 118 may then provide software and/or firmware updates to the user for their devices 112, 114, and 116. In some embodiments, the updates may be provided and/or suggested to the user via the user device 116 when they become available. In other embodiments, the updates may be provided to the user when the user asks if there is an update. In still further embodiments, the updates may be provided and/or suggested when a device is potentially infected.

An exemplary system for monitoring and determining the trust worthiness of devices for connections to gateways may be used in concert with the connection categories systems as described herein and in U.S. patent application Ser. No. 16/918,998, filed Jul. 23, 2020, which is incorporated by reference herein. The methods described in said application can be perform before, after, or during the advertisement and evaluation of the connectivity categories.

Figure 2:
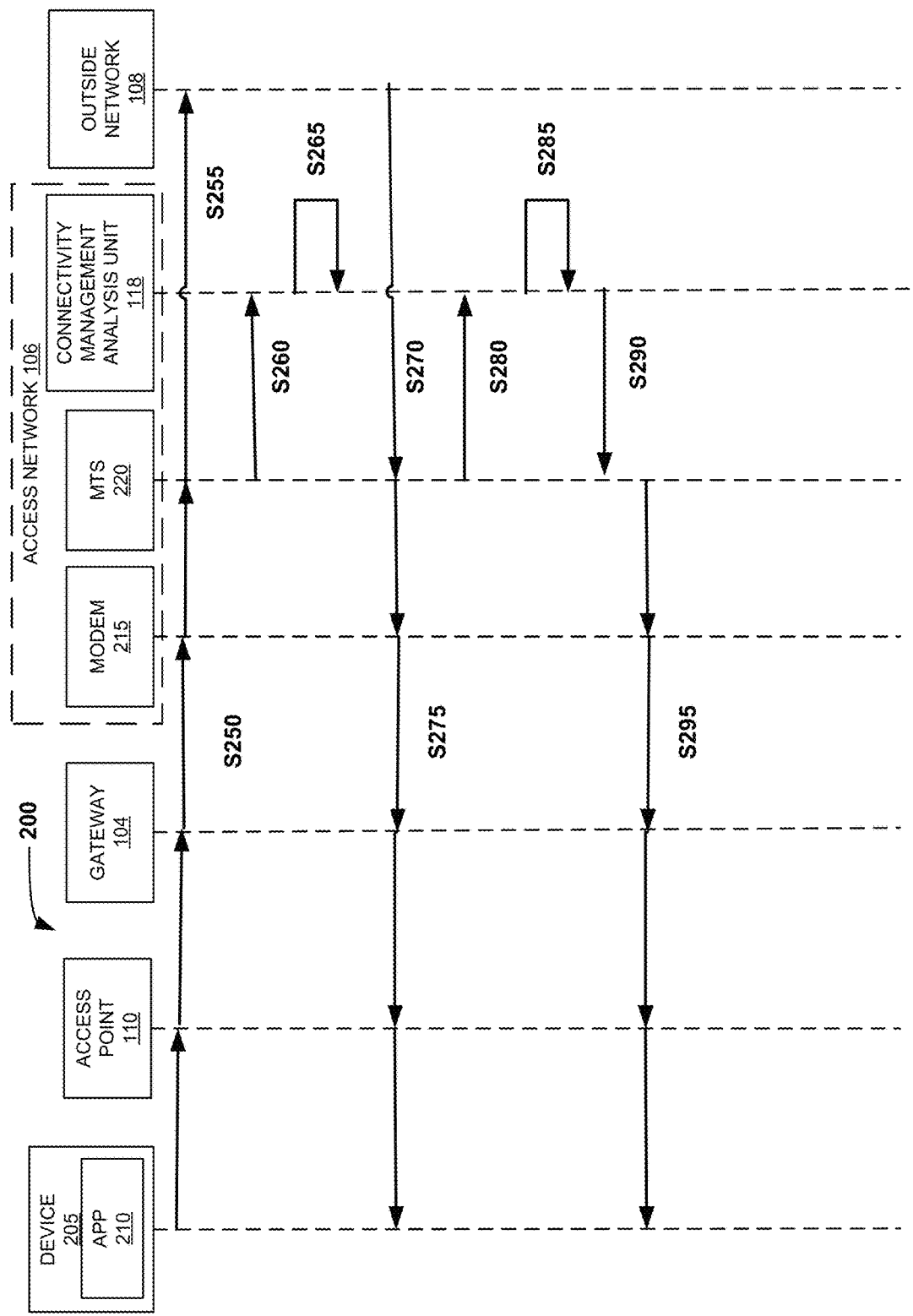
FIG. 2 illustrates a timing diagram of a process for monitoring a device on the local network shown in FIG. 1.

FIG. 2 illustrates a timing diagram of a process 200 for monitoring a device on the local network 102 (shown in FIG. 1). In the exemplary embodiment, device 205 is similar to at least one of device A 112, device B 114, and user device 116 (all shown in FIG. 1). In the exemplary embodiment, device 205 includes one or more apps 210, such as but not limited to, utility applications, gaming applications, communication applications and/or office work applications. In the exemplary embodiment, devices 205 connect to the local network 102 via access points 110, which can provide wired and/or wireless connections. In some embodiments, the gateway 104 and the access point 110 are separate devices. In other embodiments, the gateway 104 and the access point 110 are in the same device.

In the exemplary embodiment, the access point 110 is in communication with one or more devices 205, where each device includes a plurality of applications 210. The access point 110 is also in communication with at least one gateway 104, which is in communication with the access network 106, which interfaces between the local network 102 and one or more outside networks 108.

The access network 106 includes at least a modem 215, a modem termination system (MTS) 220, and one or more polices for the local network 102 and/or the access network 106. The outside network 108 includes a plurality of destination servers, which are destinations for communication with one or more apps 210 or one or more devices 205. For example, a destination server on the outside network 108 can be a gaming server that allows the use to connect to for playing one or more games on the gaming server. In another example, the destination server can be a work server and/or a school server that allows the user to access their work or school. A further destination server on the outside networks 108 could be a controller for a piece of malware installed on the device 205.

In step S250, the device 205 connects to the local network 102 and transmits one or more messages for the outside network 108. The one or more messages are routed to the access point 110, then to the gateway 104, to the modem 215 and then to the MTS 220. In step S255, the MTS 220 routes the one or more messages to the outside network 108 and then on to their destination. In step S260, the MTS 220 also routes the one or more messages to the connectivity management analysis unit 118. In step S265, the connectivity management analysis unit 118 analyzes and potentially saves the one or more messages. In some embodiments, the connectivity management analysis unit 118 only saves the header information of the one or more messages. In still further embodiments, the connectivity management analysis unit 118 only saves specific portions of the one or more messages.

In step S270, the MTS 220 receives one or more messages from the outside network 108 for the device 205. In step S275, the MTS 220 routes the one or more messages to the modem 215, then to the gateway 104, then to the access point 110, and then to the device 205. In step S280, the MTS 220 also routes the one or more messages to the connectivity management analysis unit 118. In step S285, the connectivity management analysis unit 118 analyzes and stores the one or more messages. The connectivity management analysis unit 118 may only store the headers and/or a portion of the headers to save space.

In step S285, the connectivity management analysis unit 118 performs an analysis of the messages between the devices 205 and the outside network 108. In the exemplary embodiment, the connectivity management analysis unit 118 generates a report about the communications to and from the local network 102 on a periodic basis, such as, but not limited to, once a week, once a month, or once a day. In step S290, the connectivity management analysis unit 118 transmits the report to the MTS 220. Then in step S295, the MTS 220 transmits the report to a device 205 associated with the user, such as user device 116 (shown in FIG. 1). In other embodiments, the connectivity management analysis unit 118 generates the report upon request from the user.

In some embodiments, the connectivity management analysis unit 118 stores the headers of messages or portions of headers of messages between the devices 205 and the outside network 108. Then the connectivity management analysis unit 118 performs analysis on those message headers to determine the attributes of communications with each of the devices 205 on the local network 102. An example report can be seen in FIG. 6.

While the above lists the communication with the connectivity management analysis unit 118 being in communication with the connectivity management analysis unit 118. In other embodiments, the connectivity management analysis unit 118 could also be a part of the local network 102 and in direct communication with the access point 110 and/or the gateway 104.

In some embodiments, the connectivity management analysis unit 118 employs machine learning and/or other artificial intelligence techniques to implement the systems and methods described herein. For example, the ML can be used to determine communications that could be associated with different malware or botnets. The ML could also allow the connectivity management analysis unit 118 to learn which sites or destination that the user does not wish their devices 205 to communicate with.

Figure 3:
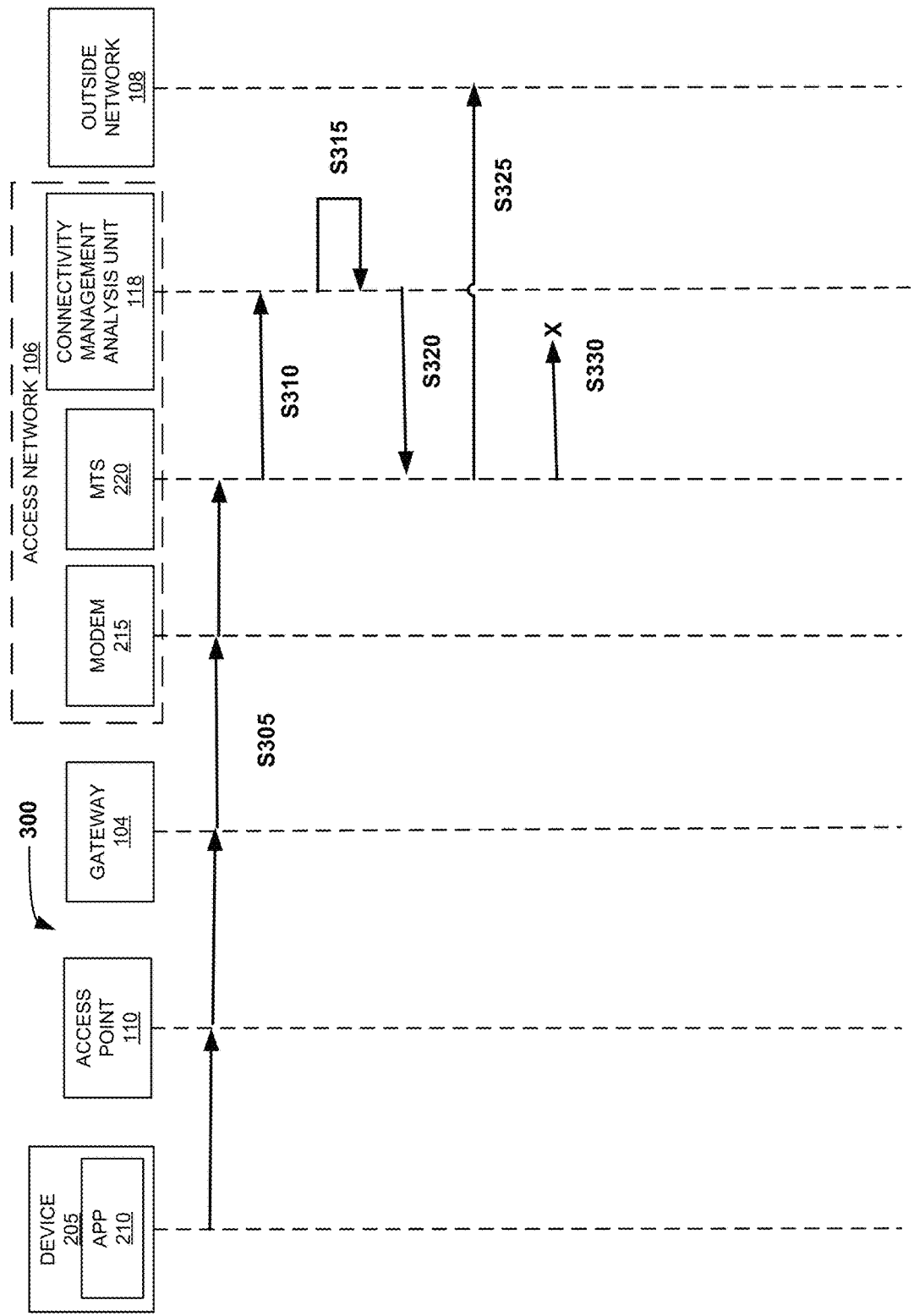
FIG. 3 illustrates a timing diagram of a process for managing traffic from a device on the local network shown in FIG. 1.

FIG. 3 illustrates a timing diagram of a process 300 for managing traffic from a device 205 on the local network 102 (shown in FIG. 1). In the exemplary embodiment, the connectivity management analysis unit 118 includes one or more settings that describe how the user desires the devices 205 to connect. For example, the one or more settings could include that the smart refrigerator is not allowed to communicate on port 400-700, that a specific user device 116 is not allowed to access any encrypted DNS servers, and that no communications are to be sent to IP addresses associated hosted on different continents.

In step S305, the device 205 connects to the local network 102 and transmits one or more messages for the outside network 108. The one or more messages are routed to the access point 110, then to the gateway 104, to the modem 215 and then to the MTS 220. In step S310, the MTS 220 routes the one or more messages to the connectivity management analysis unit 118. In step S315, the connectivity management analysis unit 118 analyzes the one or more messages in comparison to the one or more settings.

In step S320, the connectivity management analysis unit 118 transmits one or more instructions to the MTS 220. If the connectivity management analysis unit 118 approved the one or more messages, then the instructions instruct the MTS 220 to perform step S325 and route the one or more messages to the outside network 108 and then on to their destination. If the connectivity management analysis unit 118 rejects the one or more messages, then the instructions instruct the MTS 220 to perform step S330 and drops the one or more messages.

While the above lists the communication with the connectivity management analysis unit 118 being in communication with the connectivity management analysis unit 118. In other embodiments, the connectivity management analysis unit 118 could also be a part of the local network 102 and in direct communication with the access point 110 and/or the gateway 104.

Figure 4:
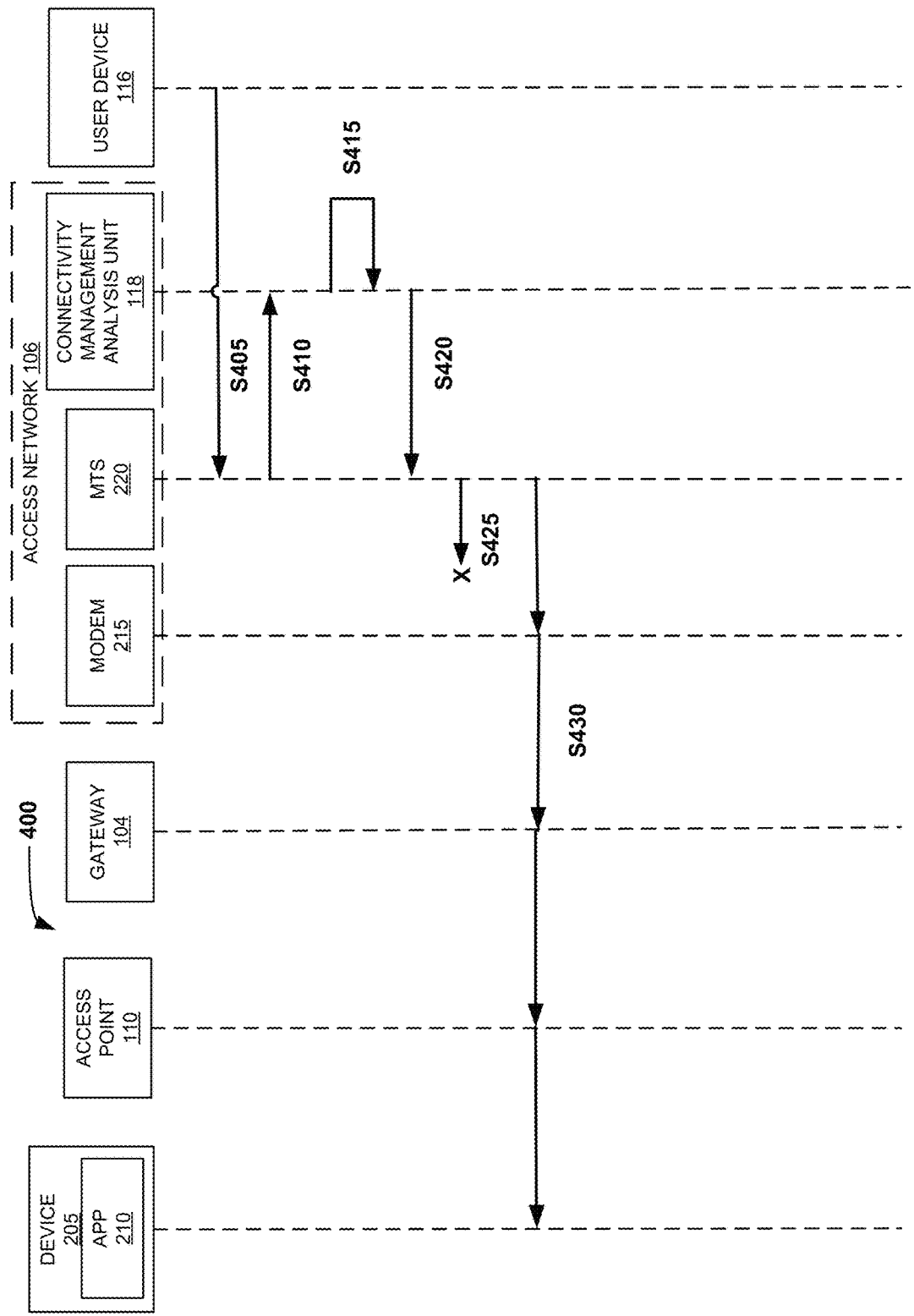
FIG. 4 illustrates a timing diagram of a process for managing traffic to a device on the local network shown in FIG. 1.

FIG. 4 illustrates a timing diagram of a process 400 for managing traffic to a device 205 on the local network 102 (shown in FIG. 1). In the exemplary embodiment, the connectivity management analysis unit 118 includes one or more settings that describe how the user desires the devices 205 to connect. For example, the one or more settings could include that the smart refrigerator is not allowed to communicate on port 400-700, that a specific user device 116 is not allowed to access any encrypted DNS servers, and that no communications are to be sent to IP addresses associated hosted on different continents.

In step S405, the MTS 220 receives one or more messages for a device 205 on the local network 102. In step 4310, the MTS 220 routes the one or more messages to the connectivity management analysis unit 118. In step S415, the connectivity management analysis unit 118 analyzes the one or more messages in comparison to the one or more settings.

In step S420, the connectivity management analysis unit 118 transmits one or more instructions to the MTS 220. If the connectivity management analysis unit 118 approved the one or more messages, then the instructions instruct the MTS 220 to perform step S430 and route the one or more messages to the device 205 through the modem 215, the gateway 104, and the access point 110/If the connectivity management analysis unit 118 rejects the one or more messages, then the instructions instruct the MTS 220 to perform step S425 and drops the one or more messages.

While the above lists the communication with the connectivity management analysis unit 118 being in communication with the connectivity management analysis unit 118. In other embodiments, the connectivity management analysis unit 118 could also be a part of the local network 102 and in direct communication with the access point 110 and/or the gateway 104.

While the analysis and filtering in processes 300 and 400 are performed by the connectivity management analysis unit 118, in some embodiments, the connectivity management analysis unit 118 can instruct other devices to perform the filtering. In some of these embodiments, the connectivity management analysis unit 118 can inform the individual devices 205 to close ports and refuse messages from specific IP addresses. In other embodiments, the connectivity management analysis unit 118 instructs the access point 110, the gateway 104 (both shown in FIG. 1), the modem 215, and/or the MTS 220 (both shown in FIG. 2) to automatically drop messages with certain attributes, i.e., source IP address, destination IP address, communication ports, message size, message frequency, and/or destinations. In these embodiments, the automatic filtering may be performed in addition to the filtering performed in processes 300 and 400.

In some embodiments, the connectivity management analysis unit 118 employs machine learning and/or other artificial intelligence techniques to improve the systems and methods described herein. For example, the ML can be used to determine additional communications that could be associated with different malware or botnets. The ML could detect similar patterns to those that were previously used and equate those patterns with one or more settings to restrict additional communication ports, source and destination IP addresses, and/or information.

In some further embodiments, the connectivity management analysis unit 118 may access the Manufacturer Usage Description (MUD) associated with one or more devices 205 on the local network 102. In some embodiments, the connectivity management analysis unit 118 uses the MUD to determine if traffic to and from the device 205 is unusual. In other embodiments, the connectivity management analysis unit 118 uses the MUD to restrict the device 205 so that only communications described by the MUD can be used with the device 205.

In still further embodiments, the connectivity management analysis unit 118 stored consumer usage descriptions (CUD) to outline the approved behavior of different devices. The MUD and CUD can be used as portions of the settings for the devices on the network 102.

Figure 5:
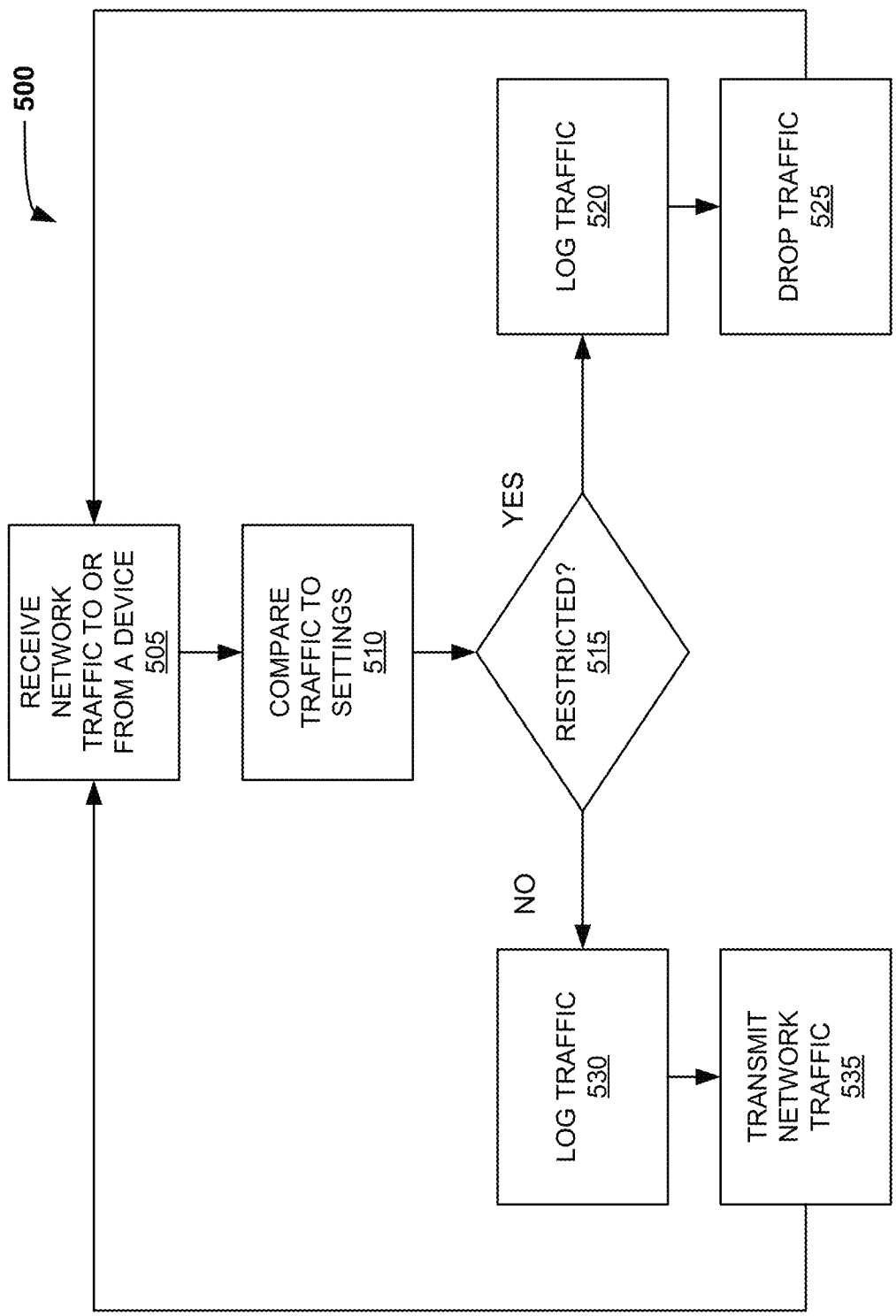
FIG. 5 illustrates a process for monitoring devices on the local network shown in FIG. 1.

FIG. 5 illustrates a process 500 for monitoring devices 205 (shown in FIG. 2) on the local network 102 (shown in FIG. 1). In the exemplary embodiment, the steps of process 500 may be performed by one or more of the access point 110, the gateway 104, the connectivity management analysis unit 118 (all shown in FIG. 1), and the MTS (shown in FIG. 2).

In the exemplary embodiment, the connectivity management analysis unit 118 receives S505 network traffic to or from a device 205 on the local network 102. The network traffic may be from or to one or more destinations in the outside network 108 (shown in FIG. 1). The connectivity management analysis unit 118 compares 510 the traffic to one or more settings. The settings include user and system settings that can include, restricted source and destination IP addresses, restricted communication ports, restricted bandwidth usage, and/or other settings restricting or allowing the behavior of the devices 205 on the local network 102. If the connectivity management analysis unit 118 determines 515 that the network traffic is restricted, the connectivity management analysis unit 118 logs 520 and drops 525 the network traffic. Then the connectivity management analysis unit 118 returns to step 505. If the connectivity management analysis unit 118 determines 515 that the network traffic is not restricted, the connectivity management analysis unit 118 logs 530 and transmits 535 the network traffic. Then the connectivity management analysis unit 118 returns to step 505.

Process 500 continues during the operations of local network 102 to monitor and manage the devices 205 and their communications with the outside networks 108. In some embodiments, process 500 is further used to store patterns of messaging behavior to detect additional potential cybersecurity threats.

Figure 6:
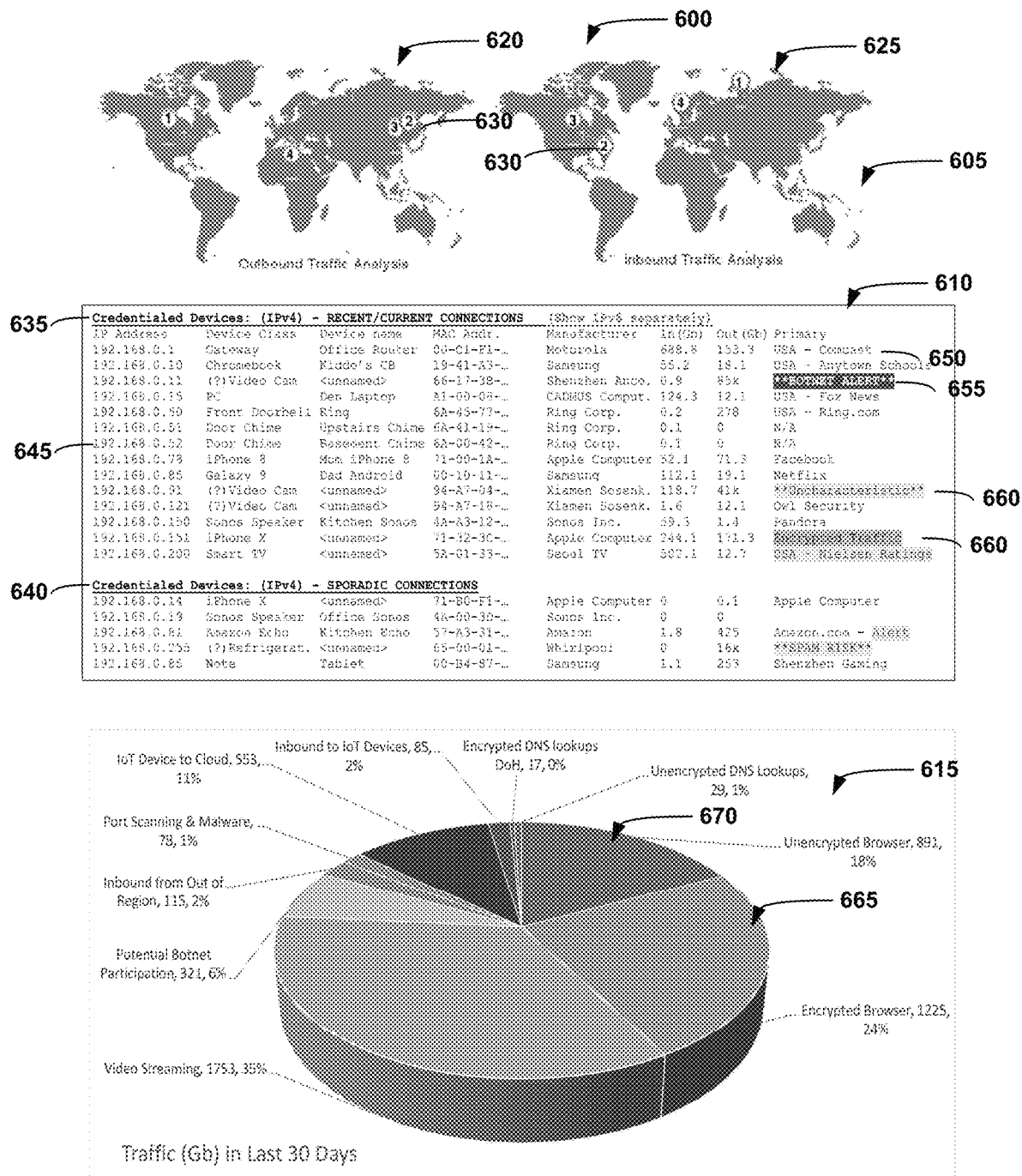
FIG. 6 illustrates a sample report from monitoring devices on the local network shown in FIG. 1.

FIG. 6 illustrates a sample report 600 from monitoring devices 205 (shown in FIG. 2) on the local network 102 (shown in FIG. 1). In the exemplary embodiment, the report 600 includes multiple sections. A traffic location section 605 illustrates the locations of IP addresses that data travels from and to the network 102. A device connection section 610 illustrates the devices 205 on the network 102 and what connections that they have made. A bandwidth section 615 describes the data traffic that has traveled in and out of the network.

The traffic location section 605 illustrates the countries to which data has traveled to 620 and from 625. Different locations 630 of interest are highlighted. For example, data is being transmitted to locations 630 in Canada, Asia, and northern Africa. Furthermore, devices 205 are receiving data from Russia, Cuba, Chicago, and Norway. The user can select a location 630 to learn more about the data and/or devices that are communicating with different locations. In some embodiments, the traffic location section 605 only shows new or different locations since the last report 600. In other embodiments, the traffic location section 605 shows the largest, the most unusual, or the locations 630 associated with the highest-risk.

The device connection section 610 may show information about current connections 635 and sporadic or infrequent connections 640. The device connection section 610 displays a plurality of entries 645, where each entry 645 is associated with a different device 205 on the network 102. The entries 645 can include information such as, but not limited to, the source and destination IP address, communication port, the device type or class, the device name, the MAC address, the manufacturer, the inbound and outbound traffic, timing information, frequency information, and the results 650 of the analysis of the traffic to and from the device. The analysis results 650 for each entry 645 provides information determined about the corresponding device 205 from the analysis of the traffic to and from that device 205 by the connectivity management analysis unit 118 (shown in FIG. 1). Furthermore, the analysis results 650 could include alerts 655 and warnings 660 about the devices 205. For example, an alert 655 could be because the connectivity management analysis unit 118 has determined that the device 205 has been participating in one or more botnet attacks. A warning 660 could be because uncharacteristic behavior has been detected or significant amounts of encrypted traffic.

The bandwidth section 615 can provide information about the different types of traffic to and from the network 102. Each pie slice represents a portion of the total traffic for the period of the report 600. For example, a first pie slice 665 could be for encrypted traffic to and from browsers, while the second pie slice 670 could be for unencrypted traffic to and from the same browsers.

In the exemplary embodiment, the report 600 is interactive and the user may drill down on different sections to receive more and specific information. For example, the user could select a location 630, an entry 645, and/or a pie slice 665 to learn more information about that particular item. In one example, the user could select the entry 645 for an iPhone X that has a warning 660 about encrypted traffic. The user could then learn that the encrypted traffic relates to an encrypted DNS lookup that one of the user's children is using on their iPhone. This could cause the user to investigate where the child is browsing.

In another example, the user could select the entry 645 for their video camera with an alert 655 for a potential botnet. The report 600 could then display the behavior of the traffic to and from that video camera. In some embodiments, the report 600 may include the option for the user to block the video camera from accessing addresses associated with the botnet, such as shown in process 300 (shown in FIG. 3).

In a further example, the user could select the pie slice 665 associated with video streaming and determine that their streaming service has been streaming 24 hours a day. The user could determine that they accidentally left the streaming service app on autoplay and have not stopped it.

As described above, the connectivity management analysis unit 118 can use the report 600 to provide options to the user to make one or more changes to their settings for the network 102 to prevent or limit certain types of message traffic to or from the network 102 and/or to and from certain devices.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., policies, usage categories, device settings, connectivity categories, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably protecting the integrity and efficiency of computer networks and the devices on those networks at the server-side, and by further enabling the easier and more efficient identification of devices and network traffic at the server-side and the client-side. The present embodiments therefore improve the speed, efficiency, and reliability in which such determinations and processor analyses may be performed. Due to these improvements, the aspects described herein address computer-related issues that significantly improve the efficiency of transmitting messages in comparison with conventional techniques. Thus, the aspects herein may be seen to also address computer-related issues such as dynamic network settings for different devices on network between electronic computing devices or systems, for example.

Exemplary embodiments of systems and methods for category based network device and traffic identification and routing are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

In some embodiments, the design system is configured to implement machine learning, such that the neural network "learns" to analyze, organize, and/or process data without being explicitly programmed. Machine learning may be implemented through machine learning (ML) methods and algorithms. In an exemplary embodiment, a machine learning (ML) module is configured to implement ML methods and algorithms. In some embodiments, ML methods and algorithms are applied to data inputs and generate machine learning (ML) outputs. Data inputs may include but are not limited to: analog and digital signals (e.g. sound, light, motion, natural phenomena, etc.) Data inputs may further include: sensor data, image data, video data, and telematics data. ML outputs may include but are not limited to: digital signals (e.g. information data converted from natural phenomena). ML outputs may further include: speech recognition, image or video recognition, medical diagnoses, statistical or financial models, autonomous vehicle decision-making models, robotics behavior modeling, fraud detection analysis, network routing decision, user input recommendations and personalization, game AI, skill acquisition, targeted marketing, big data visualization, weather forecasting, and/or information extracted about a computer device, a user, a home, a vehicle, or a party of a transaction. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, recurrent neural networks, Monte Carlo search trees, generative adversarial networks, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function which maps outputs to inputs and utilize the predictive function to generate ML outputs based on data inputs. The example inputs and example outputs of the training data may include any of the data inputs or ML outputs described above. For example, a ML module may receive training data comprising data associated with events that occurred, generate a model which maps the data preceding the event to data about when and where the event occurred, and generate predictions of when that event may occur again in the future based on current data. In another example, a further ML module may receive training data comprising historical routing information, generate one or more models that maps the accuracy of the received routing information, and generate predictions about the accuracy of new routing information in view of those models.

In another embodiment, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship. In an exemplary embodiment, a ML module coupled to or in communication with the design system or integrated as a component of the design system receives unlabeled data comprising event data, financial data, social data, geographic data, cultural data, and political data, and the ML module employs an unsupervised learning method such as "clustering" to identify patterns and organize the unlabeled data into meaningful groups. The newly organized data may be used, for example, to extract further information about the potential network routers.

In yet another embodiment, ML methods and algorithms are directed toward reinforcement learning, which involves optimizing outputs based on feedback from a reward signal. Specifically ML methods and algorithms directed toward reinforcement learning may receive a user-defined reward signal definition, receive a data input, utilize a decision-making model to generate a ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In an exemplary embodiment, a ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict optimal constraints.

In some embodiments, the ML module may determine that using one or more variables in one or more models are unnecessary in future iterations due to a lack of results or importance. Furthermore, the ML module may recognize patterns and be able to apply those patterns when executing models to improve the efficiency of that process and reduce processing resources. In some embodiments, ML modules may be executed on ML training computational units customized for ML training. For example, in some embodiments, tensor processing units (TPUs) may be used for ML training.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A network device for maintaining a communication network by preventing devices on the communication network from performing undesired activities, comprising:

a transceiver configured for operable communication with a plurality of devices over a communication medium of the communication network, wherein the plurality of devices includes a first device and a second device; and a processor in communication with a memory, the memory configured to store computer-executable instructions, which, when executed by the processor, cause the network device to:

store a plurality of settings for operation of the communication network;

monitor message traffic to and from the plurality of devices including the first device and the second device via the communication network, wherein the first device is a first device type and the second device is a second device type, wherein the first device type and the second device type are different, and wherein expected message traffic for the first device type is different than expected message traffic for the second device type;

determine that the first device is the first device type and that the second device is the second device type based upon the monitored message traffic;

generate a report based on the monitored message traffic including the first device type and the second device type;

transmit, to a user via a user device, the report;

receive, from the user via the user device, an update to one or more settings of the plurality of settings for operation of the communication network to create an updated plurality of settings including blocking a first port for the first device based upon the first device type;

monitor additional message traffic to and from the plurality of devices including the first device and the second device via the communication network; and filter one or more messages of the additional message traffic based on the updated plurality of settings, wherein filtering the one or more messages includes dropping a first message addressed to the first port of the first device and allowing a second message addressed to the first port of the second device based upon the updated plurality of settings associated with the first device being the first device type and the second device being the second device type.

2. The network device of claim 1, wherein the instructions further cause the network device to:
analyze the message traffic to detect at least one potential cybersecurity threat; and
cause the network device to restrict communications to or from a device associated with the at least one potential cybersecurity threat.

3. The network device of claim 2, wherein the instructions further cause the network device to report the at least one potential cybersecurity threat to the user via the user device.

4. The network device of claim 1, wherein the instructions further cause the network device to:
analyze the message traffic to determine at least one country that the message traffic was routed to or from based upon an associated risk associated with that at least one country; and
report, to the user via the user device, the at least one country that the message traffic was routed to or form.

5. The network device of claim 1, wherein the instructions further cause the network device to:
monitor a plurality of messages to and from the first device;
determine whether each message of the plurality of messages is allowed based on at least one of the plurality of settings and the updated plurality of settings; and
if the determination is that a third message is allowed, transmit the third message.

6. The network device of claim 5, wherein the instructions further cause the network device to drop the third message if the determination is that the third message is not allowed.

7. The network device of claim 5, wherein the third message is allowed based on one or more settings in a manufacturer usage description associated with the first device.

8. The network device of claim 1, wherein the instructions further cause the network device to instruct at least one of an access point and a gateway associated with the communication network to filter one or more message based on the updated plurality of settings.

9. The network device of claim 1, wherein the instructions further cause the network device to instruct an Internet of Things (IoT) device connected to the communication network to filter one or more message based on the updated plurality of settings.

10. The network device of claim 1, wherein the instructions further cause the network device to analyze the message traffic based on source IP address, communication port, destination IP address, bandwidth used, message size, and message frequency.

11. The network device of claim 1, wherein the instructions further cause the network device to determine a first software update to the first device based upon the first device type and a second software update to the second device based upon the second device type, and wherein the first software update and the second software update are different.

12. The network device of claim 1, wherein the network device is a gateway device.

13. A method for maintaining a communication network by preventing devices on the communication network from performing undesired activities, the method implemented by a computer device comprising a transceiver configured for operable communication with a plurality of devices over a communication medium of the communication network; and a processor in communication with a memory, the memory configured to store computer-executable instructions to be executed by the processor, the method comprising:
storing a plurality of settings for operation of the communication network;
monitoring message traffic to and from the plurality of devices including a first device and a second device via the communication network, wherein the first device is a first device type and the second device is a second device type, wherein the first device type and the second device type are different, and wherein expected message traffic for the first device type is different than expected message traffic for the second device type;
determining that the first device is the first device type and that the second device is the second device type based upon the monitored message traffic;
generating a report based on the monitored message traffic including the first device type and the second device type;
transmitting, to a user via a user device, the report;
receiving, from the user via the user device, an update to one or more settings of the plurality of settings for operation of the communication network to create an updated plurality of settings including blocking a first port for the first device based upon the first device type;
monitoring additional message traffic to and from the plurality of devices including the first device and the second device via the communication network; and
filtering one or more messages of the additional message traffic based on the updated plurality of settings, wherein filtering the one or more messages includes dropping a first message addressed to the first port of the first device and allowing a second message addressed to the first port of to the second device based upon the updated plurality of settings associated with the first device being the first device type and the second device being the second device type.

14. The method of claim 13 further comprising:
analyzing the message traffic to detect at least one potential cybersecurity threat; and
restricting communications to or from a device associated with the at least one potential cybersecurity threat.

15. The method of claim 14 further comprising reporting the at least one potential cybersecurity threat to the user via the user device.

16. The method of claim 14 further comprising providing one or more updates to be installed on the device associated with the at least one potential cybersecurity threat.

17. The method of claim 13 further comprising:
monitoring a plurality of messages to and from the first device;
determining whether each message of the plurality of messages is allowed based on at least one of the plurality of settings and the updated plurality of settings;
if the determination is that a third message is allowed, transmitting the third message; and
dropping the first message if the determination is that the third message is not allowed.

18. The method of claim 17 further comprising allowing the third message based on one or more settings in a manufacturer usage description associated with the first device.

19. The method of claim 13 further comprising instructing at least one of an access point and a gateway associated with the communication network to filter one or more message based on the updated plurality of settings.

20. The method of claim 13 further comprising instructing an Internet of Things (IoT) device connected to the communication network to filter one or more message based on the updated plurality of settings.

\* \* \* \* \*